United States Patent
Rayl et al.

(10) Patent No.: US 6,752,121 B2
(45) Date of Patent: Jun. 22, 2004

(54) CYLINDER DEACTIVATION SYSTEM TIMING CONTROL SYNCHRONIZATION

(75) Inventors: Allen B. Rayl, Waterford, MI (US); Gregory D. Polen, Bartlett, TN (US)

(73) Assignee: General Motors Corporation, Detroit, MI (US)

( * ) Notice: Subject to any disclaimer, the term of this patent is extended or adjusted under 35 U.S.C. 154(b) by 17 days.

(21) Appl. No.: 10/150,871

(22) Filed: May 17, 2002

(65) Prior Publication Data

US 2002/0189575 A1 Dec. 19, 2002

Related U.S. Application Data

(60) Provisional application No. 60/292,157, filed on May 18, 2001.

(51) Int. Cl.[7] .................................................. F01L 1/34
(52) U.S. Cl. ................................. 123/198 F; 123/90.16
(58) Field of Search ........................ 123/198 F, 90.16, 123/90.15, 90.17, 90.39, 90.44, 90.18, 90.27, 90.12, 347

(56) References Cited

U.S. PATENT DOCUMENTS

| | | | | |
|---|---|---|---|---|
| 4,423,712 A | * | 1/1984 | Mayne et al. | 123/90.15 |
| 4,510,900 A | * | 4/1985 | Quenneville | 123/90.12 |
| 5,255,637 A | * | 10/1993 | Schechter | 123/90.15 |
| 5,425,335 A | * | 6/1995 | Miyamoto et al. | 123/198 F |
| 5,490,486 A | * | 2/1996 | Diggs | 123/198 F |
| 5,537,963 A | * | 7/1996 | Hasebe et al. | 123/198 F |
| 6,125,801 A | * | 10/2000 | Mendler | 123/90.15 |
| RE37,604 E | * | 3/2002 | Kaufman et al. | 123/90.12 |
| 6,499,451 B1 | * | 12/2002 | Hendriksma et al. | 123/90.16 |
| 6,553,950 B2 | * | 4/2003 | Chiappini et al. | 123/90.16 |
| 6,588,394 B2 | * | 7/2003 | Zheng | 123/198 F |

* cited by examiner

*Primary Examiner*—Henry C. Yuen
*Assistant Examiner*—Jason Benton
(74) *Attorney, Agent, or Firm*—Christopher DeVries (57) ABSTRACT

An engine control system in a vehicle including a variable displacement internal combustion engine configured as an overhead valve engine including telescoping lifters hydraulically actuated by solenoid valves, via hydraulic lines, to activate and deactivate valves and cylinders in the variable displacement internal combustion engine, a controller for controlling the displacement of the variable displacement internal combustion engine, and where the controller determines the delay time between a displacement command and the actual change in the position of the telescoping lifters.

7 Claims, 6 Drawing Sheets

STATES

FIG. 5

TIME BASED LOGIC

CYLINDER DEACTIVATION SYSTEM TIMING CONTROL SYNCHRONIZATION

This application claims priority from Provisional Application No. 60/292,157 filed May 18, 2001.

TECHNICAL FIELD

The present invention relates to the control of internal combustion engines. More specifically, the present invention relates to a method and apparatus to control a variable displacement internal combustion engine.

BACKGROUND OF THE INVENTION

Present regulatory conditions in the automotive market have led to an increasing demand to improve fuel economy and reduce emissions in present vehicles. These regulatory conditions must be balanced with the demands of a consumer for high performance and quick response for a vehicle. Variable displacement internal combustion engines (ICEs) provide for improved fuel economy and torque on demand by operating on the principal of cylinder deactivation. During operating conditions that require high output torque, every cylinder of a variable displacement ICE is supplied with fuel and air (also spark, in the case of a gasoline ICE) to provide torque for the ICE. During operating conditions at low speed, low load, and/or other inefficient conditions for a fully displaced ICE, cylinders may be deactivated to improve fuel economy for the variable displacement ICE and vehicle. For example, in the operation of a vehicle equipped with an eight-cylinder variable displacement ICE, fuel economy will be improved if the ICE is operated with only four cylinders during low torque-operating conditions by reducing throttling losses.

Throttling losses, also known as pumping losses, are the extra work that an ICE must perform to pump air from the relatively low pressure of an intake manifold through the ICE and out to the atmosphere. The cylinders that are deactivated will not allow air flow through their intake and exhaust valves, reducing pumping losses by forcing the ICE to operate at a higher intake manifold pressure. Since the deactivated cylinders do not allow air to flow, additional losses are avoided by operating the deactivated cylinders as "air springs" due to the compression and decompression of the air in each deactivated cylinder.

During the operation of the ICE, if the ICE is in a condition where it is inefficient to operate with the full complement of cylinders, a controller will deactivate the mechanisms operating the valves for selected cylinders and also shut off fuel to the cylinders. During a high torque demand condition for the ICE, the cylinders will be reactivated by operating the valves and supplying fuel to the cylinders.

SUMMARY OF THE INVENTION

The present invention is a method and apparatus for the control of cylinder deactivation in a variable displacement engine. In the preferred embodiment of the present invention, an eight-cylinder internal overhead valve (OHV) combustion engine (ICE) may be operated as a four-cylinder engine by deactivating four cylinders. The cylinders are deactivated by an electro-hydraulic deactivation system using engine oil pressure, controlled by solenoids, to pressurize the locking pins of special switching engine valve lifters (as used in an OHV engine). With pressure applied, the locking pins disengage and allow the lifter to act as a lost motion device to prevent exhaust and intake valve activation.

A problem associated with hydraulic devices and control devices in general is the response time. The device inertia, hydraulic line flex, the movement of hydraulic fluid, and other physical performance characteristics create a delay between the commanded hydraulic control and the actual response. The delay may create problems with synchronizing cylinder deactivation, reactivation and engine control events. Proper synchronization of the cylinder deactivation system is necessary to ensure the exhaust lifter is always deactivated or reactivated prior to the intake valve deactivation or reactivation, respectively. Deactivation and reactivation of a cylinder/valve must occur within a small crank angle window to insure the exhaust valve state change always leads the intake valve state change. Improper timing can result in poor driveability, increased emissions and/or mechanical problems.

The control system of the present invention generates response time estimates for the system based on the physical properties of the solenoid valve, hydraulic system, lifter and other devices used in cylinder deactivation to accurately control the solenoid timing. Test or timing data is generated from a simulation of a physical model of the system and testing of the solenoid, hydraulic interface and lifter on a hydraulic test fixture with adjustable pressure, temperature, and voltage. A response time estimation is then generated based on the test data and physical properties of the devices involved during the cylinder deactivation/reactivation.

The precise timing for solenoid control is delivered by a timer processor unit (TPU) or similar device with output compare timers based on camshaft and crankshaft reference position detector inputs. Solenoid timing is controlled by an event based state machine. A state machine is a representation of an event-driven (reactive) system. In an event-driven system, the system transitions from one state (mode) to another prescribed state, provided that the condition defining the change is true. The state machine uses an array of records stored in a controller for valve status and solenoid status. The valve status record includes the valve mode (enabling, disabling, disabled, enabled), events from target angle, injector state change cylinder event, air model transient mode cylinder event, air model calculation change cylinder events, and fuel injector status. The solenoid status record includes the target angle, start angle, start cylinder event, previous start cylinder event, TPU offset time, previous TPU offset time, and solenoid control mode.

The cylinder deactivation in the present invention occurs as a function of load or torque demand by the vehicle. An engine or powertrain controller will monitor vacuum pressure/torque and determine if the ICE should enter four-cylinder mode. Fuel economy for a variable displacement ICE is maximized by operating in a partially-displaced mode or configuration. The present invention reduces mistiming errors when deactivating and reactivating cylinders to protect the engine valve lifters and maximize the amount of time spent in a partially-displaced operation while maintaining the same performance and driveability of a fully-displaced ICE.

DESCRIPTION OF THE PREFERRED EMBODIMENT

Figure 1:
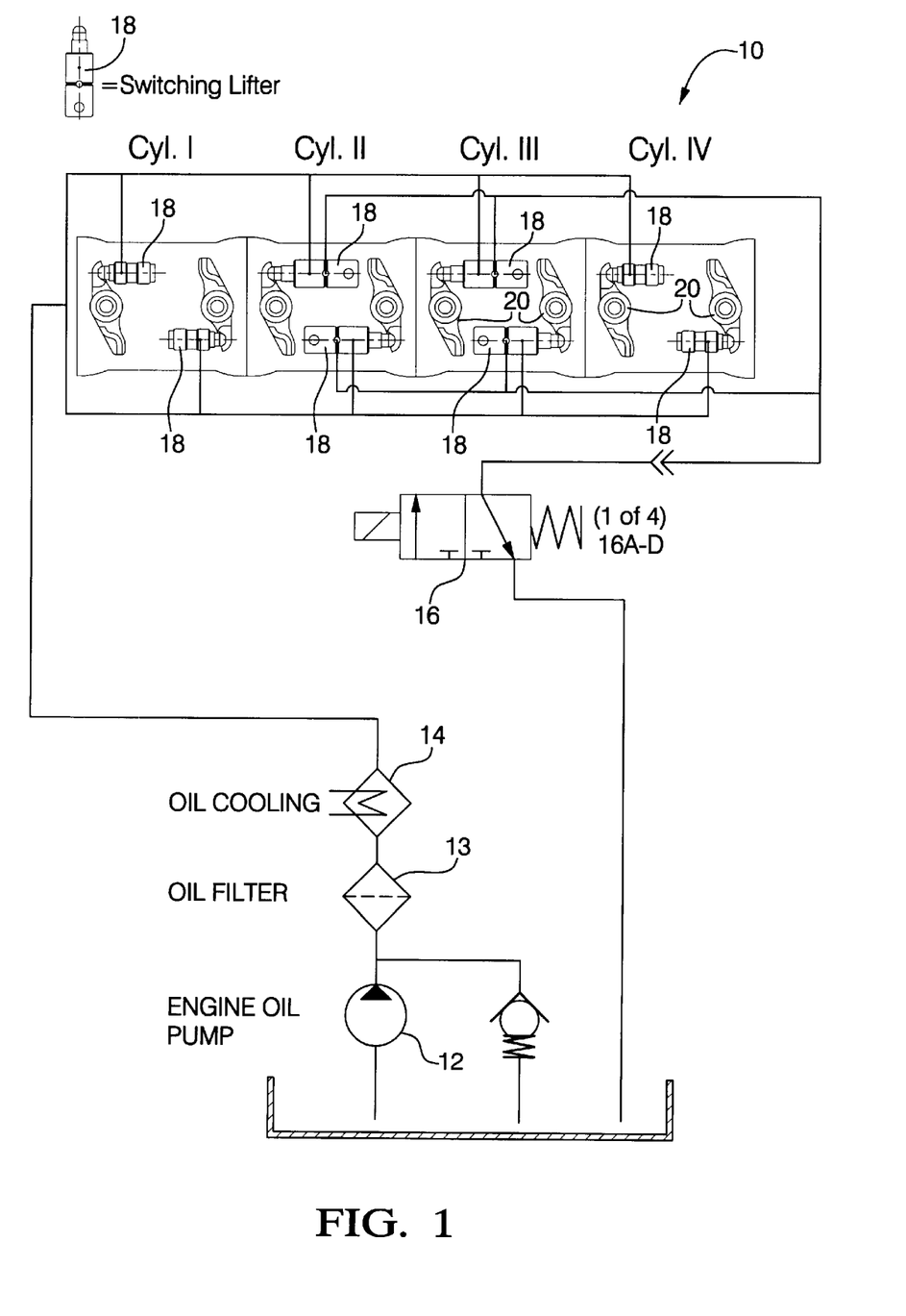
FIG. 1 is a diagrammatic drawing of the hydraulic system of the present invention.

FIG. 1 is a diagrammatic drawing of the hydraulic system used in an overhead valve (OHV) internal combustion engine (ICE) 10 of the present invention. The ICE 10 preferably is configured as a V-eight engine, but any multi-cylinder engine is considered within the scope of the present invention. An engine oil pump 12 provides oil pressure to force the oil through an oil filter 13 and oil cooler 14. The pressurized oil is switched or controlled by solenoid valve 16 to activate and deactivate at least one switchable pivot element or switching engine valve lifter 18. In the preferred embodiment, four cylinders of a V-eight engine are equipped with switchable engine lifters 18 activated by four solenoid valves 16A–D. The hydraulic elements, solenoid valves 16, and switchable lifters 18 all have physical properties that create a delay upon an actuation command.

A rocker arm 20 of the engine is shown functionally in FIG. 1 to more clearly illustrate the rocker arm 20 interaction with the switching lifters 18. As is known in the vehicle art, an OHV internal combustion engine is equipped with a lifter-pushrod-rocker assembly to actuate the intake and exhaust valves. The switchable lifter 18 of the present invention operates as a telescoping lifter coupling and decoupling with a camshaft to activate and deactivate the valves/cylinders of the engine 10. In a deactivated condition, the switching lifter 18 will not be actuated by the camshaft and the corresponding valve (or valves) will be closed. The switching lifter 18 will be locked in its extended position coupled to the camshaft when reduced oil pressure below the reactivation pressure (nominally less that 10 psi) is applied to the switching lifter 18. The switching lifter 18 will retract when a high deactivation oil pressure (nominally >20 psi) pressure is applied to the switching lifter 18 locking pin. Accordingly, controlling the solenoids 16 will control the activation and deactivation of valves/cylinders in the engine 10.

Figure 2:
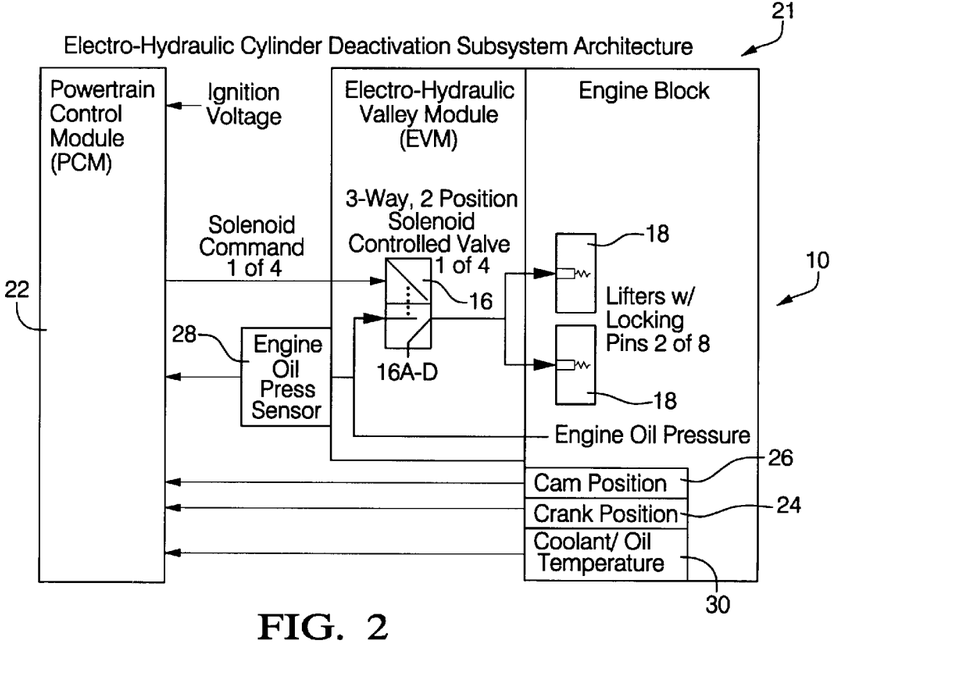
FIG. 2 is a diagrammatic drawing of the control system of the present invention.

FIG. 2 is a diagrammatic drawing of the vehicle control system 21 of the present invention. The control system 21 include the variable displacement ICE 10 equipped with ignition devices and fuel injectors controlled by an engine or powertrain controller 22, as is known in the art. The ICE 10 may comprise a gasoline ICE or any other ICE known in the art. The ICE 10 crankshaft speed and position are detected by a speed and position detector 24 that generates a signal such as a pulse train to the engine controller 22. The ICE 10 camshaft 20 speed and position are detected by a speed and position detector 26 that also generates a signal to the engine controller 22. Oil pressure and coolant/oil temperature are communicated to the engine controller 22, via an engine oil pressure sensor 28 and a coolant/oil temperature sensor 30. These speed and position detectors 24 and 26 are used to control the phase of the actuation of the solenoid valves 16, and the oil pressure and temperature sensors 28 and 30 are used for response time estimation and to diagnose engine conditions that may effect the deactivation of engine cylinders in the ICE 10.

The ICE 10 in the preferred embodiment has four of eight cylinders equipped with the switching lifters 18, but in alternate embodiments all of the cylinders in any ICE configuration may be equipped with the switching lifters 18. In this manner the cylinders in the ICE 10 supplied with air and fuel may be alternated to improve thermal management in the ICE 10.

Figure 3:
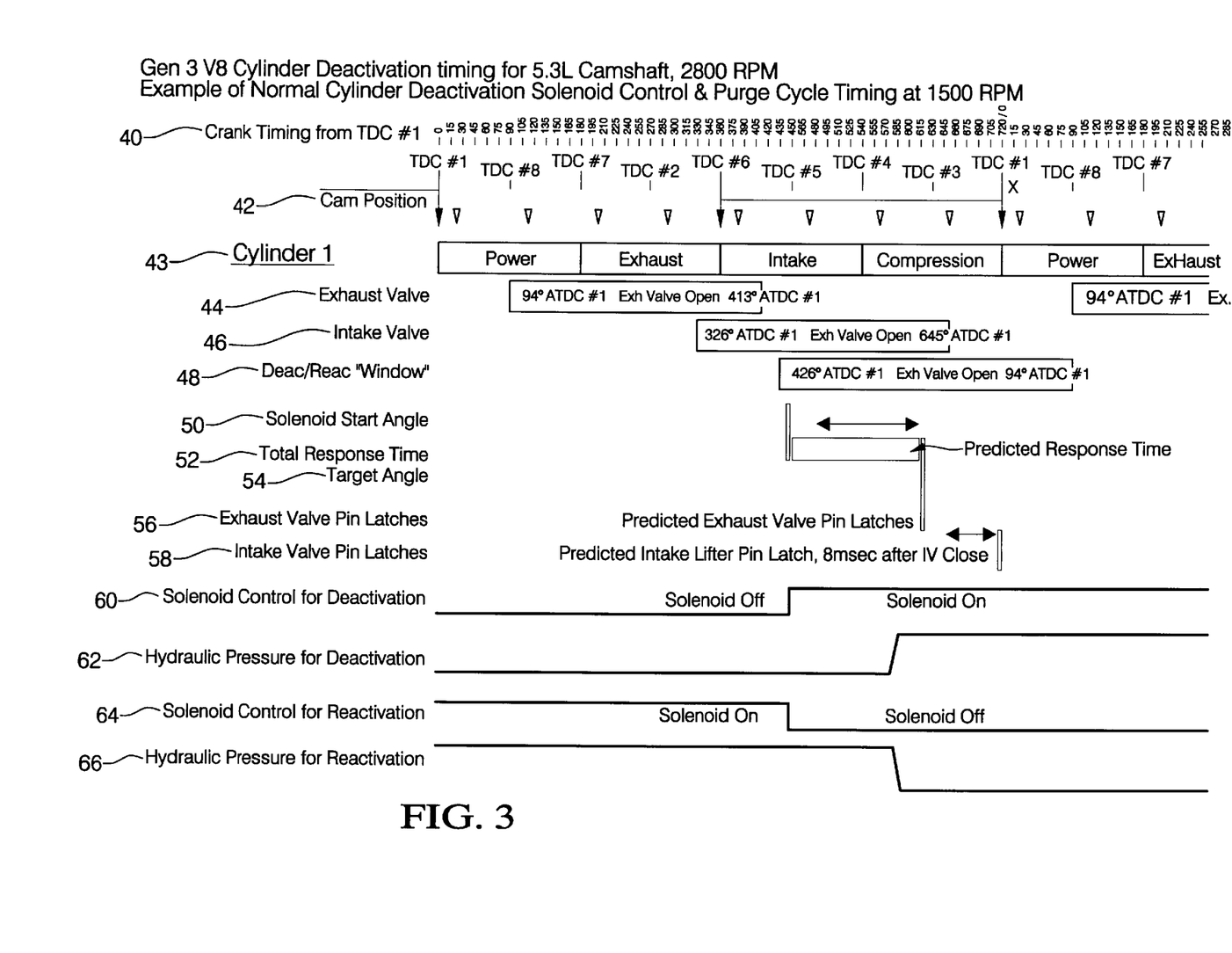
FIG. 3 is a timing diagram of the present invention illustrating the control of a solenoid used in the deactivation and reactivation of cylinders in an internal combustion engine.

FIG. 3 is a timing diagram of the present invention illustrating control of the solenoid 16 with reference to the ICE 10 operation. The timing diagram includes a crank timing plot 40, a cam position plot 42, cylinder operation plot 43, an exhaust valve timing plot 44, an intake valve timing plot 46, a Deac/Reac window timing plot 48, a solenoid start angle timing plot 50, a total response time plot 52, a target angle 54 plot, an exhaust valve pin latch change plot 56, an intake valve pin latch change plot 58, a solenoid control for deactivation plot 60, a hydraulic pressure for deactivation plot 62, a solenoid control for reactivation plot 64, and a hydraulic pressure for reactivation plot 66, all versus time.

The plots 40 and 42 illustrate the interaction between the crankshaft and camshaft of the ICE 10. The plot 43 illustrates the power, exhaust, intake and compression strokes of cylinder 1 in the ICE 10. The plots 44 and 46 diagram the opening and closing of the intake and exhaust valve for cylinder 1 of the ICE 10. The Deac/Reac window for changing the valve state is shown by the plot 48 and typically starts after the intake valve starts its opening ramp and ends with the start of the exhaust valve opening ramp. The solenoid start angle of plot 50 is set to the difference between the target angle of plot 54 (within the target window) and the predicted response time, converted to crank angle domain at the current engine speed. The total response time of plot 52 is the sum of the estimated solenoid, hydraulic, and actuator response times. The plots 56 and 58 indicate when the switching elements 18 for the exhaust and intake valves latch.

The operation of the phasing and hydraulic pressure applied to the solenoid 16 for deactivation is shown by plots 60 and 62, with the solenoid turn-on control signal of plot 60 starting at the predicted solenoid start angle of plot 50. The hydraulic pressure of plot 62 begins to increase as the solenoid opens. The operation of the phasing and hydraulic pressure applied to the solenoid 16 for reactivation is shown by plots 64 and 66, with the solenoid turn-off control signal of plot 64 starting at the predicted solenoid start angle of plot 50. The hydraulic pressure of plot 66 begins to decrease as the solenoid closes.

Figure 4:
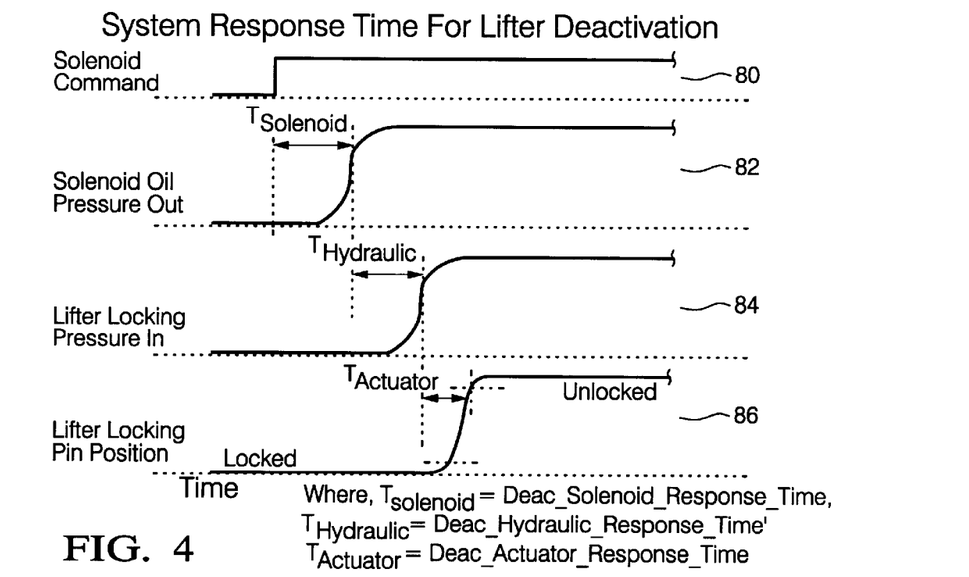
FIG. 4 is a timing diagram illustrating a system response time in the present invention.

FIG. 4 illustrates the response time or delays for lifter deactivation. FIG. 4 includes a solenoid command plot 80, a solenoid oil pressure plot 82, a lifter/switchable oil pressure plot 84, and a lifter locking pin position plot 86. As can be seen in plots 80 and 82, there is a delay $T_{Solenoid}$ between the solenoid command and the solenoid pressure increase. As can be seen in plots 82 and 84, there is a delay $T_{Hydraulic}$ to allow the fluid pressure to propagate to the pivot element 18. As can be seen in plots 84 and 86, there is a delay $T_{Actuator}$ between the application of lifter pressure and the transition between a locked and unlocked condition for the pivot element 18. These delays must be accurately predicted to insure proper timing for the actuation of the pivot elements 18.

Figure 5:
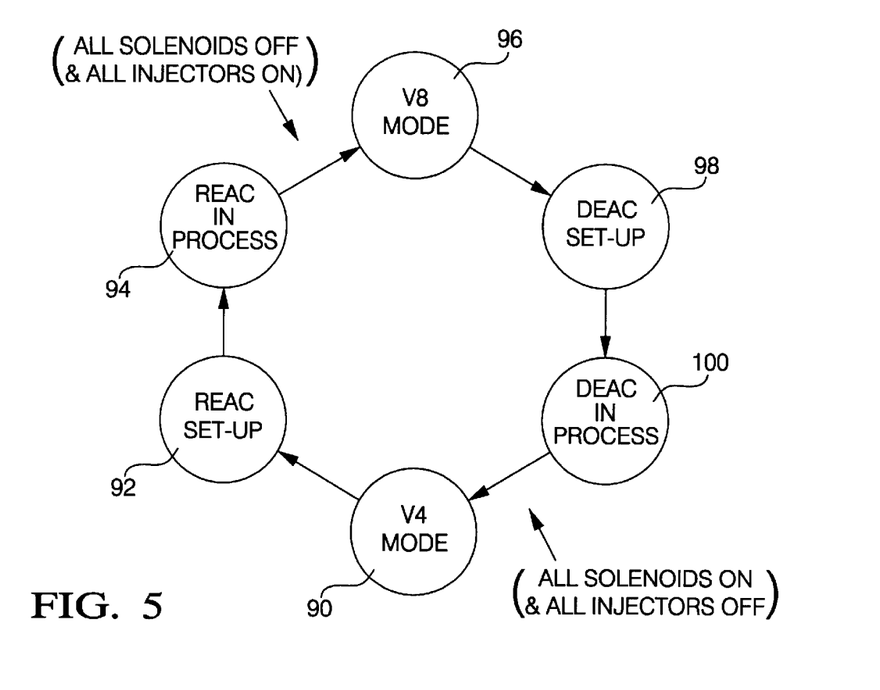
FIG. 5 is a state diagram illustrating the operation of the present invention.

FIG. 5 is a state diagram broadly illustrating the concept of cylinder deactivation. Starting at state 90, where the engine is in V4 mode, the vehicle control system 21 may determine that entry into full displacement is required and enter into state 92, where the reactivation of the cylinders is initiated. Entering state 94, the reactivation is still in process and engine timing and the application of fuel and spark is calculated. After the reactivation state, solenoids 16A–D are in an off state, all the cylinders are supplied with air fuel and spark at state 96, and the engine 10 is in a fully displaced V8 operating mode. If the vehicle control system 21 determines that the engine 10 may enter a partially displaced configuration, then at state 98 the deactivation is initiated. Entering state 100, the deactivation is still in process and engine timing and the application of fuel and spark is calculated.

Figure 6:
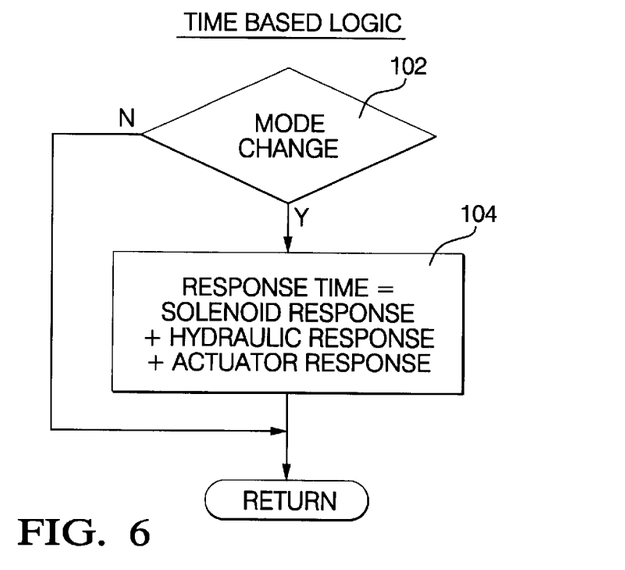
FIG. 6 is a simple flowchart detailing the calculation of a response time.

FIG. 6 is a flowchart illustrating the calculation of a response or delay time for the control system 21 of the present invention. At block 102, the routine determines if a displacement mode change is planned. At block 104, the response time of the system is calculated by adding the values illustrated in FIG. 3 $T_{Solenoid}$, $T_{Hydraulic}$, and $T_{Actator}$. The values of $T_{Solenoid}$, $T_{Hydraulic}$ and $T_{Actuator}$ have been calibrated from the modeling and testing of the system and are stored in look-up tables. $T_{Solenoid}$ is a function of system voltage and oil pressure, $T_{Hydraulic}$ is a function of oil pressure and estimated aeration, and $T_{Actuator}$ is a function of oil pressure and oil temperature.

Figure 7:
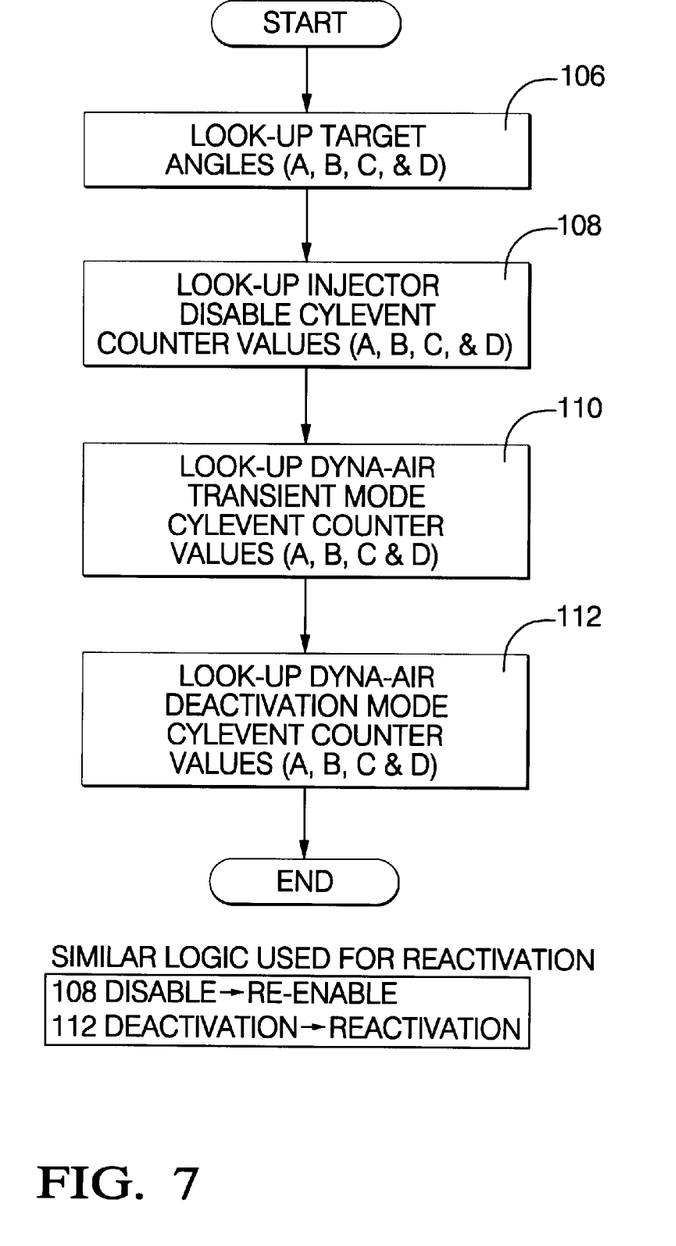
FIGS. 7 and 8 are flowcharts of the cylinder deactivation method of the present invention.

FIG. 7 is a flowchart illustrating the deactivation setup for control system of the present invention operating at state 98 seen in FIG. 5. At block 106 the target angles for the deactivation of four solenoids 16, A–D, are recalled from a look-up table. At block 108, the injector disable cylinder event counter values are recalled from a look-up table. The cylinder event counter is initialized to zero for cylinder one and incremented for each cylinder in the firing order based on the crank position detector input. The cylinder event counter resets to zero after the last cylinder in the firing order. This event counter is used to control the synchronization of solenoid outputs, fuel injector enable or disable, and other calculations to properly compute air/cylinder for engine fueling. At block 110, the Dyna-air transient mode cylinder event counter values are recalled from a look-up table. Dyna-air is a software routine to accurately estimate the mass of air per cylinder for proper fueling and the computation must be switched to transient mode for highest accuracy when the ICE transitions in or out of cylinder deactivation. Finally at block 112, the Dyna-air airflow calculation block cylinder deactivation mode change cylinder event counter values are recalled from a look-up table. The Dyna-air mode change cylinder event counter values are used to synchronize the switch of the air per cylinder calculation between eight and four cylinder steady state operating modes. Similar determinations are made for the reactivation set up at state 92 in FIG. 5, using a different set of look-up tables.

Figure 8:
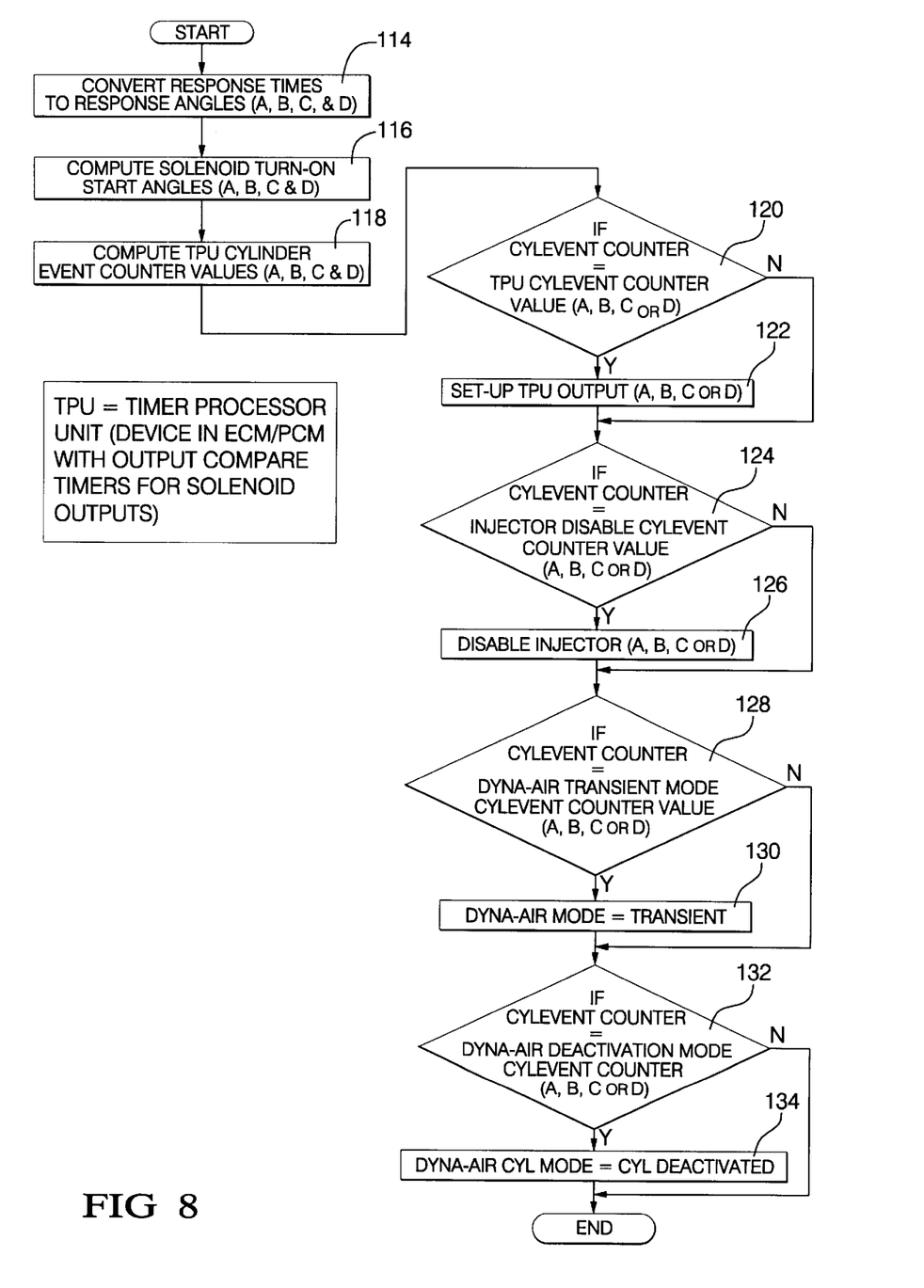

FIG. 8 is a flowchart illustrating the deactivation in process for state 100 seen in FIG. 5. At block 114, response time calculated in block 104 of FIG. 6 is converted to a response angle based on the current engine speed for the four solenoids 16, labeled A–D. At block 116, the four solenoid start angles for solenoids 16A–D are calculated from the target angles seen in FIG. 3, plot 54, and the response angle calculated in block 114. At block 118, the four cylinder event counter values to set up the four TPU output compare timers (OCT) are determined such that each OCT is not started until the engine position is within 90 to 180 crankshaft degrees of the intended solenoid start angle. This routine runs every 90 crankshaft degrees for a V8 ICE and improves the solenoid output control timing accuracy by minimizing the effects of rapid changes in engine speed by waiting until the last cylinder event before each OCT set-up. At block 120, if the cylinder event counter equals the TPU cylinder event counter value for any of the four solenoids 16A–D, then the appropriate TPU OCT is set up to transition at 122, based on its calculated start angle from block 116. At block 124, if the cylinder event counter is equal to the injector disable cylinder event counter value from 108, the appropriate injector is disabled at block 126, else the routine continues to block 128. At block 128, if the cylinder event counter is equal to the Dyna-air transient mode cylinder event counter value from block 110, then the Dyna-air mode is set to transient in block 130, else the routine continues to block 132. Finally, at block 132, if the cylinder event counter is equal to the Dyna-air reactivation mode cylinder event counter value from block 112, then the Dyna-air cylinder mode is set to cylinders deactivated in block 134. The routine is processed every cylinder event until all the TPU, injector, and Dyna-air flags are set and the engine is in V4 mode. Similar determinations are made for reactivation in process when transitioning from V4 to V8 mode.

While this invention has been described in terms of some specific embodiments, it will be appreciated that other forms can readily be adapted by one skilled in the art. Accordingly, the scope of this invention is to be considered limited only by the following claims.

What is claimed is:

1. An engine control system in a vehicle comprising:

a variable displacement internal combustion engine configured as an overhead valve engine including telescoping lifters hydraulically actuated by solenoid valves, via hydraulic lines, to activate and deactivate valves and cylinders in said variable displacement internal combustion engine;

a controller for controlling the displacement of said variable displacement internal combustion engine;

wherein said controller determines the delay time between a displacement command and the actual change in the position of said telescoping lifters.

2. The engine control system of claim 1 wherein said variable displacement internal combustion engine is a gasoline engine.

3. The engine control system of claim 1 wherein said variable displacement internal combustion engine is a six-cylinder engine.

4. The engine control system of claim 1 wherein said variable displacement internal combustion engine is an eight-cylinder engine.

5. A method of controlling a variable displacement internal combustion engine comprising the steps of:

providing at least one switchable pivot element to activate and deactivate valves in a cylinder of the variable displacement engine;

providing a pressurized fluid source coupled to the switchable pivot element via hydraulic lines to switch the switchable pivot element;

providing a solenoid to control the flow and pressure of said pressurized fluid source to the switchable pivot element; and determining the delay between an actuation command for said solenoid and said switchable pivot element and the actuation of said switchable pivot element.

6. The method of claim 5 further comprising the step of actuating said switchable pivot element to activate and reactivate the valves in the cylinder.

7. A method of controlling a hydraulic system in a variable displacement overhead valve internal combustion engine comprising the steps of:

provding a plurality of telescoping lifter elements to activate and deactivate valves in a cylinder of the variable displacement internal combustion engine;

providing a pressurized fluid source coupled to the telescoping lifter elements via hydraulic lines to couple and decouple the telescoping lifter elements from a cam shaft;

providing a plurality of solenoids to control the flow and pressure of said pressurized fluid source to the telescoping lifters;

determining the delay in the hydraulic system;

storing the delay in a look-up table; and utilizing the stored delayed to determine when to turn on the plurality of solenoids.

* * * * *